US010623428B2

(12) United States Patent
Beauchesne et al.

(10) Patent No.: US 10,623,428 B2
(45) Date of Patent: Apr. 14, 2020

(54) METHOD AND SYSTEM FOR DETECTING SUSPICIOUS ADMINISTRATIVE ACTIVITY

(71) Applicant: Vectra Networks, Inc., San Jose, CA (US)

(72) Inventors: Nicolas Beauchesne, Miami Beach, FL (US); Kevin Song-Kai Ni, San Jose, CA (US)

(73) Assignee: Vectra Networks, Inc., San Jose, CA (US)

(*) Notice: Subject to any disclaimer, the term of this patent is extended or adjusted under 35 U.S.C. 154(b) by 101 days.

(21) Appl. No.: 15/702,454

(22) Filed: Sep. 12, 2017

(65) Prior Publication Data
US 2018/0077186 A1    Mar. 15, 2018

Related U.S. Application Data

(60) Provisional application No. 62/393,585, filed on Sep. 12, 2016.

(51) Int. Cl.
*H04L 29/06* (2006.01)
*G06N 20/00* (2019.01)

(52) U.S. Cl.
CPC ......... *H04L 63/1425* (2013.01); *G06N 20/00* (2019.01); *H04L 63/1416* (2013.01); *H04L 63/1441* (2013.01); *H04L 2463/146* (2013.01)

(58) Field of Classification Search
CPC ............. H04L 63/1425; H04L 63/1441; H04L 63/1416; H04L 2463/146; G06N 20/00
See application file for complete search history.

(56) References Cited

U.S. PATENT DOCUMENTS

| | | | |
|---|---|---|---|
| 6,678,730 B2 | 1/2004 | Hellerstein et al. | |
| 7,890,627 B1 | 2/2011 | Thomas | |
| 8,015,133 B1 | 9/2011 | Wu et al. | |
| 8,266,687 B2 | 9/2012 | Baldry | |
| 8,607,340 B2 | 12/2013 | Wright | |
| 8,776,218 B2 | 7/2014 | Wright | |
| 8,800,044 B2 | 8/2014 | Raad | |
| 8,832,828 B2 | 9/2014 | Lyne et al. | |
| 9,385,993 B1 | 7/2016 | Kulp | |
| 9,485,271 B1* | 11/2016 | Roundy | H04L 63/1441 |
| 10,050,985 B2 | 8/2018 | Beauchesne et al. | |
| 2005/0234920 A1 | 10/2005 | Rhodes | |
| 2005/0281291 A1 | 12/2005 | Stolfo et al. | |

(Continued)

FOREIGN PATENT DOCUMENTS

| | | |
|---|---|---|
| WO | 2005047862 A2 | 5/2005 |
| WO | 2016073383 A1 | 5/2016 |

OTHER PUBLICATIONS

Extended European Search Report dated Jan. 8, 2018 for EP Appln. No. 17190458.4.

(Continued)

*Primary Examiner* — Jeffrey C Pwu
*Assistant Examiner* — William A Corum, Jr.
(74) *Attorney, Agent, or Firm* — Vista IP Law Group, LLP

(57) ABSTRACT

Disclosed is an improved approach for identifying suspicious administrative host activity within a network. Network traffic is examined to learn the behavior of hosts within a network. This provides an effective way of determining whether or not a host is performing suspicious activity over an administrative protocol.

24 Claims, 27 Drawing Sheets

(56) References Cited

U.S. PATENT DOCUMENTS

| | | |
|---|---|---|
| 2012/0137367 A1 | 5/2012 | Dupont et al. |
| 2014/0165195 A1 | 6/2014 | Brdiczka et al. |
| 2014/0181968 A1 | 6/2014 | Ge et al. |
| 2014/0201836 A1 | 7/2014 | Amsler |
| 2015/0101053 A1 | 4/2015 | Sipple |
| 2015/0195300 A1 | 7/2015 | Adjaoute |
| 2015/0264073 A1* | 9/2015 | Tavakoli ............. H04L 63/1425 726/23 |
| 2016/0127395 A1 | 5/2016 | Underwood |
| 2016/0182544 A1* | 6/2016 | Adjaoute ............ H04L 63/1416 705/7.15 |
| 2017/0054744 A1* | 2/2017 | Mumcuoglu ....... H04L 63/1441 |

OTHER PUBLICATIONS

European Office Action dated Nov. 14, 2019 for EP Appln. No. 17190458.4.

* cited by examiner

METHOD AND SYSTEM FOR DETECTING SUSPICIOUS ADMINISTRATIVE ACTIVITY

BACKGROUND

Identification of internal threats based on network traffic is a critical goal of any network security appliance. An internal threat in the context of this document is defined by unauthorized access by a user to a restricted resource. While the computer or machine in question may be typically accessed for more common purposes, the restricted resource may actually be a service that allows for specific uses such as administration of a machine. This user may or may not be an employee or contractor of the company responsible for this resource. The user may gain access to this resource through stolen credentials, malware, or other means. Typically, the restricted resources of interest are accessed via specific protocols usually used for administration.

To explain, consider the illustrative example shown in FIG. 1A. Here, a set of hosts within a network are accessed by an administrative node to perform certain administrative operations. As shown in FIG. 1B, the issue is that a malicious entity on an attacker node may attempt to use administrative protocols and/or perform administrative operations upon those hosts in the network. The problem is that with conventional systems, it is often very difficult to effectively and efficiently detect this type of malicious activity.

Many existing network security products may attempt to detect unauthorized access to a machine via access logs. However, fine grain logging might not always be supported by the target device, and the accounts being used are likely to be "superuser" or "root" which are authorized but used maliciously. Also, using centralized authentication is sometimes impossible or risky to implement in architecture devices such as switches, routers, or baseboard management controllers. In more dynamic environments such as virtual machine based datacenters, the logging is sometime not performed due to the transient nature of the target host.

As is evident, there is a need for an improved approach to identify suspicious administrative activity within a network.

SUMMARY

In some embodiments, network traffic is examined to learn the behavior of hosts within a network. This provides an effective way of determining whether or not a host is performing suspicious activity over an administrative protocol.

According to some embodiments, the disclosed invention provides a way to identify a host that performs administrative activity. A host can then be identified as being an administrator. Further, hosts are identified that are administered by the administrator. The group of hosts identified as being administered by an administrator can considered as the administrator's realm.

Additionally, the system identifies suspicious administrative activity in an organization's network via observation and learning of administrative hosts, administrative network activity, and administrative behavior. Suspicious activity can then be defined as a host accessing an administrator's realm when it has not typically done so. Suspicious activity can also be flagged for a connection wherein the initiator host, who is not an administrator, administers a target host over a specific subset of administrative ports or protocols.

Further details of aspects, objects, and advantages of some embodiments are described below in the detailed description, drawings, and claims. Both the foregoing general description and the following detailed description are exemplary and explanatory, and are not intended to be limiting as to the scope of the embodiments.

BRIEF DESCRIPTION OF THE DRAWINGS

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIGS. 7A-7D, 8A-8C, 9A-9C, 10A through 10D-2 provide illustrative examples of the detection process.

DETAILED DESCRIPTION

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Figure 1A:
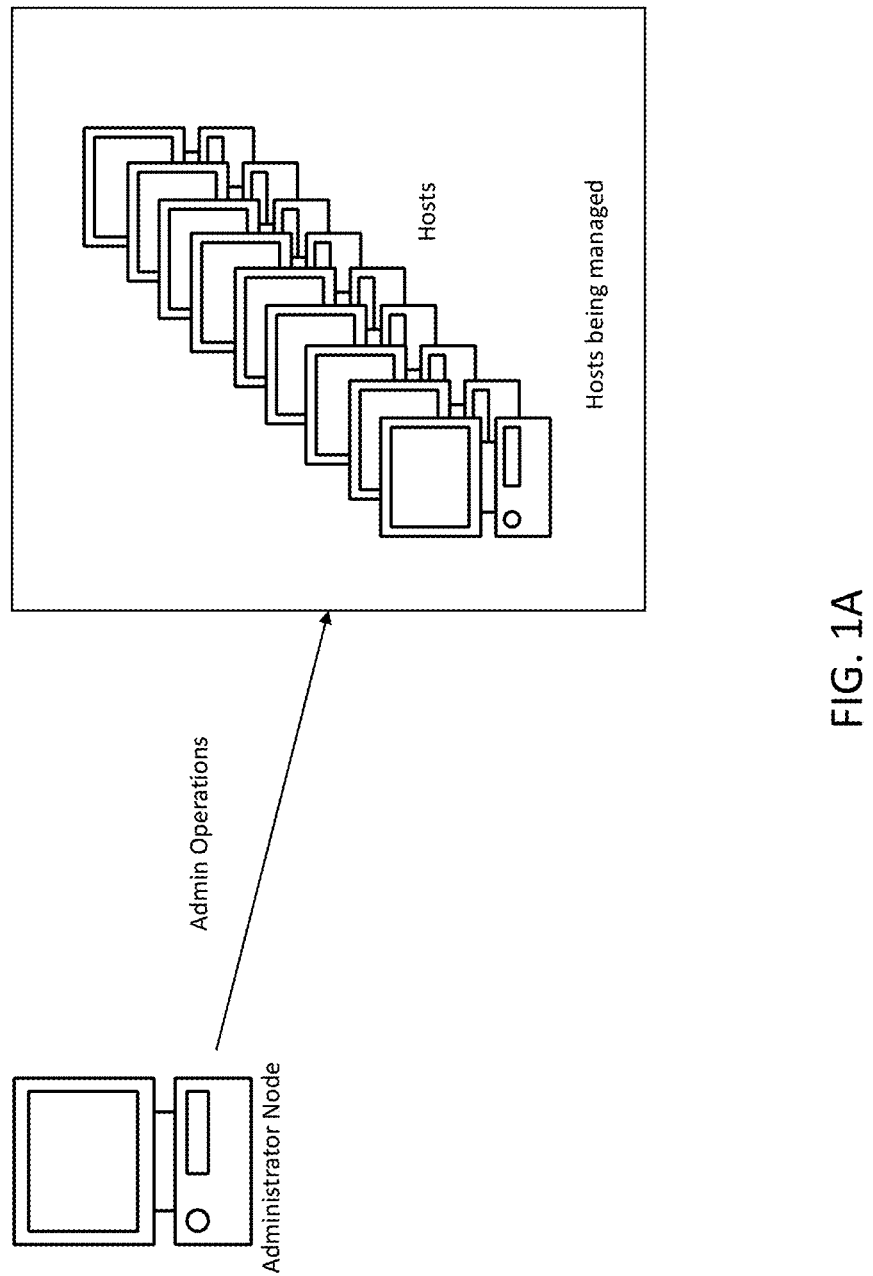
FIGS. 1A-1B illustrate the problem addressed by some embodiments of the invention.
Figure 1B:
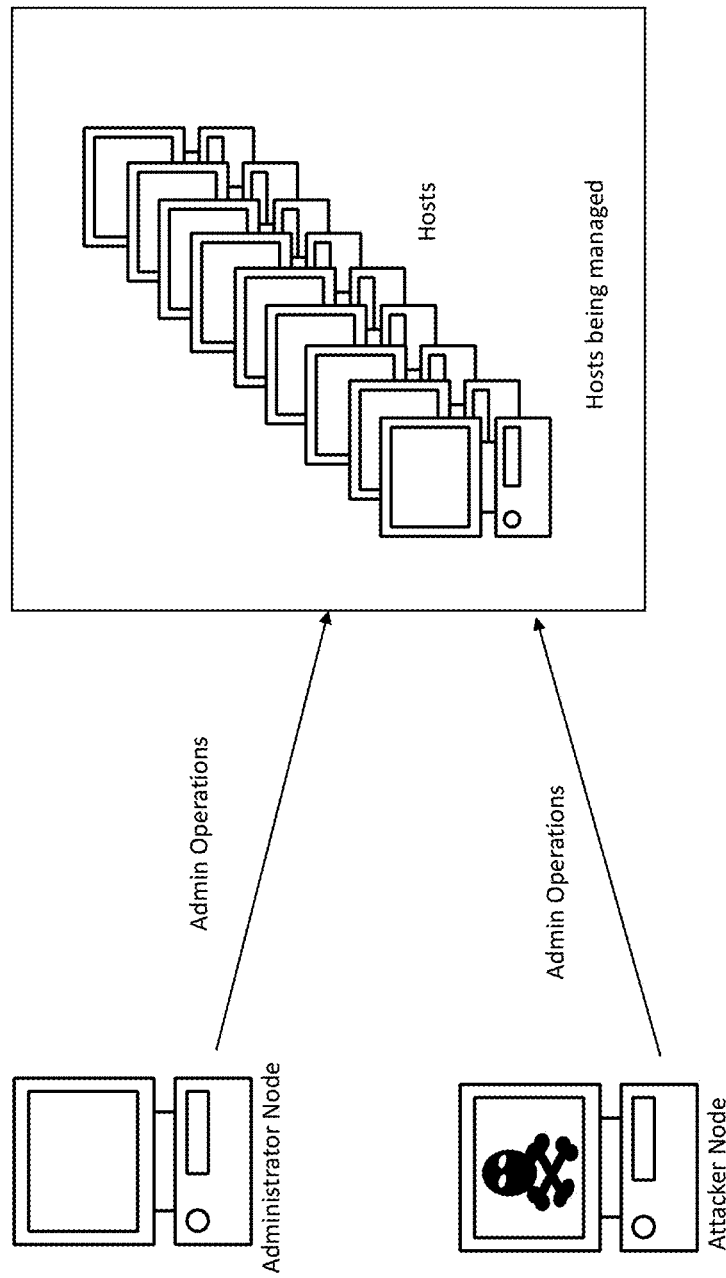
Figure 2:
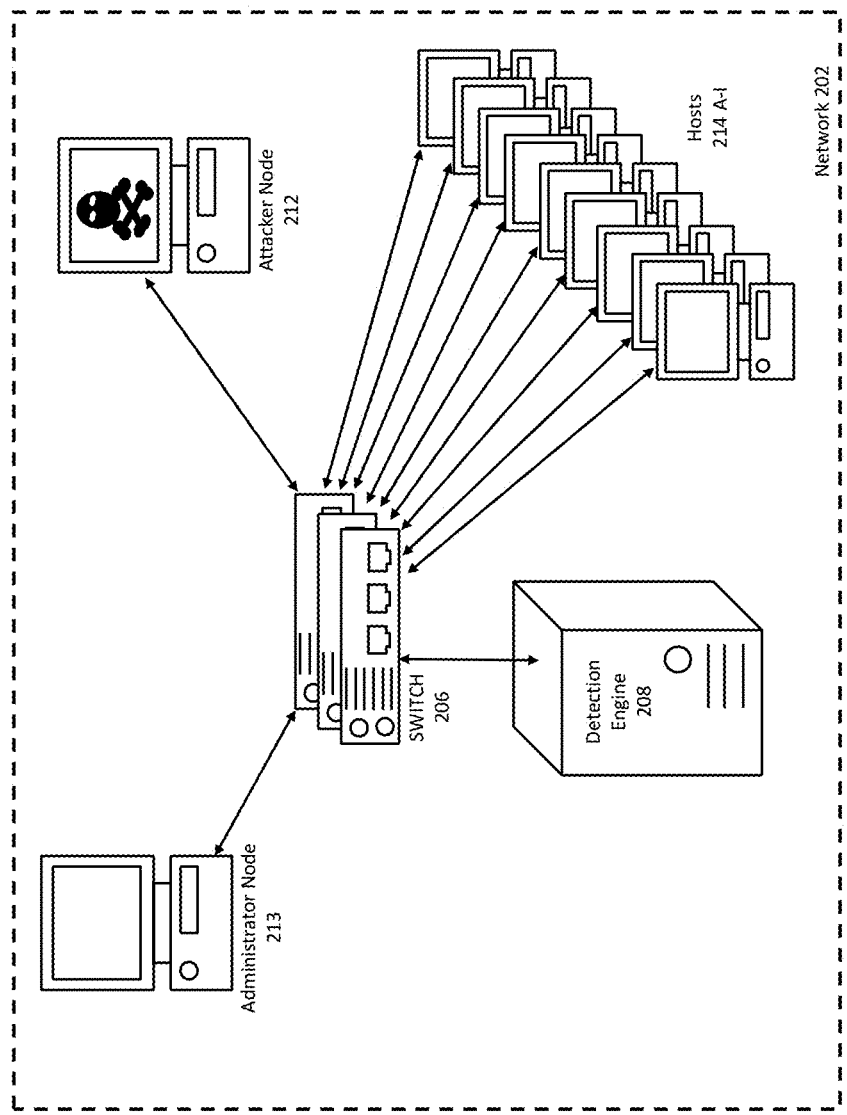
FIG. 2 illustrates an example operating environment in which the inventive processing may be implemented, as according to some embodiments.

FIG. 2 illustrates an example operating environment in which the inventive processing may be implemented, as according to some embodiments. As illustrated, the environment comprises network 202, which may include one or more host computers/hosts 214a-i that may communicate with one another through one or more network devices, such as one or more network switches 206. The hosts or entities within network 202 may interface with external networks or hosts through one or more network border devices, such as a firewall. Though the hosts 214a-i are illustrated as isolated in the network 202, one of ordinary skill in the art appreciates that the approaches disclosed here can be implemented on individual computers that are not part of an internal network (the inventive concepts are applicable regardless of whether the hosts are within an internal network or part of an external network).

A network monitor/detection engine 208 may be configured to monitor or tap the network switch 206 to passively analyze the internal network traffic in a way that does not hamper or slow down network traffic (e.g. by creating a copy of the network traffic for analysis). In some embodiments, the network monitor 208 is an external module or physical computer that is coupled to the switch 206. In some additional embodiments, the network monitor 208 may be directly integrated as an executable set of instructions into network components, such as the switch 206 or a firewall. While still, in some embodiments the network monitor 208 may be integrated into one or more hosts, such as hosts 214*a-c*, in a distributed fashion (e.g. each host may have its own set copy of the distributed instructions and the hosts collectively agree to follow or adhere to instructions per protocol to collect and analyze network traffic). In some embodiments, the network monitor 208 can be implemented within one or more virtual machine(s) or containers (e.g., operating system level virtualized-application containers, such as Docker containers and/or LXC containers) sitting on one or more physical hosts. Still in some embodiments, the network monitor 208 may be integrated into a single host (e.g., host 214*b*) that performs network monitor 108 actions for the network 202.

In the illustrated environment, the hosts may connect to one another using different network communication protocols, such as IP, TCP and/or UDP. The network monitor 208 may be configured to work as a passive analysis device that can receive, store, and analyze all network traffic sent/received by a single host, or a multitude of hosts. In some embodiments, all network communications may be passed through the switch 206 and the network monitor 208 may tap or span (TAP/SPAN) the switch 206 to access and create a copy of the network communications; for example, by performing a packet capture and saving the network communications in one or more packet capture files. Once received, the network communications may be parsed into flows that correspond to sessions.

Figure 3:
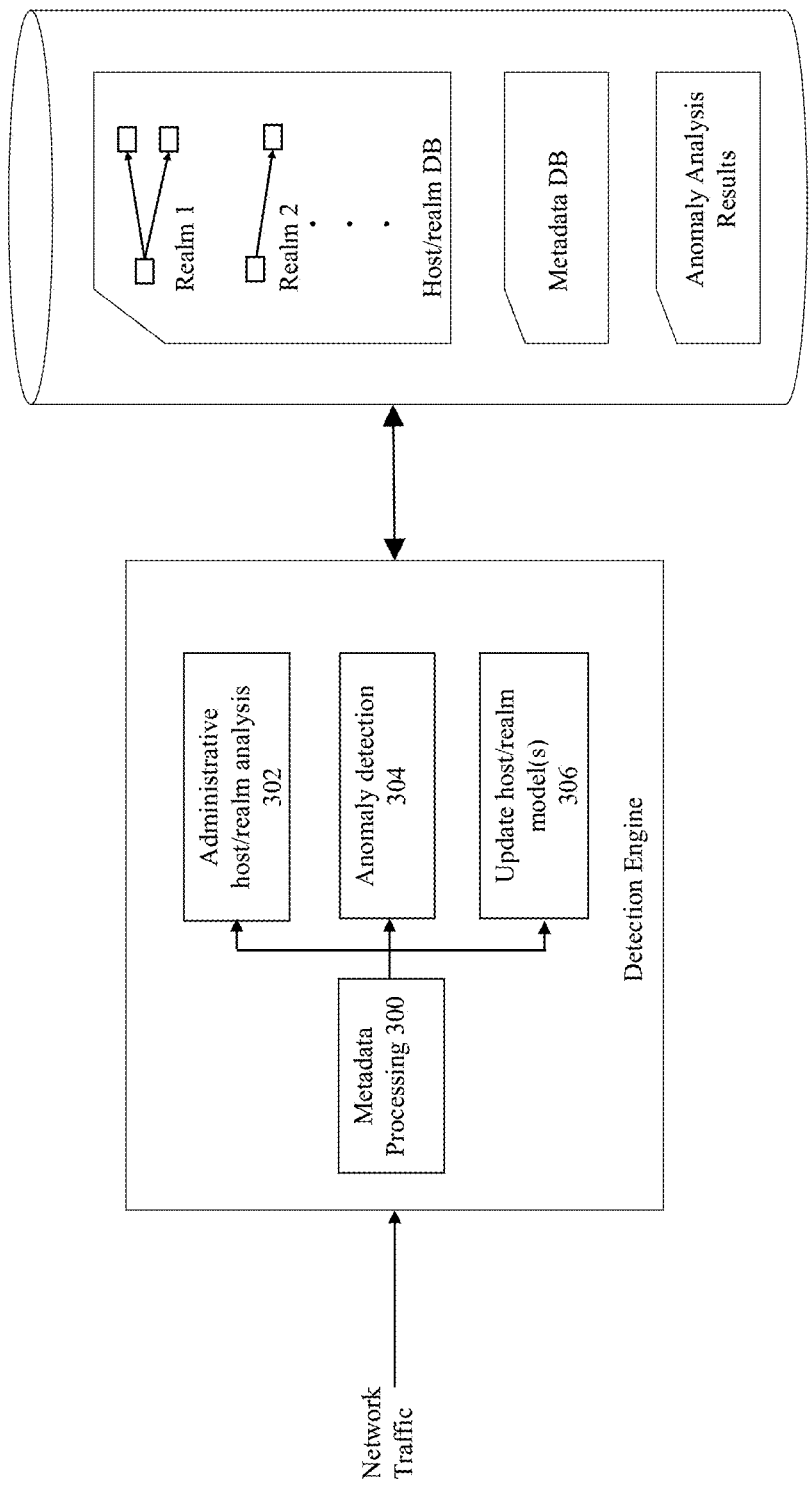
FIG. 3 shows a more detailed view of the detection engine.

FIG. 3 shows a more detailed view of the detection engine, at which network traffic is examined to learn the behavior of hosts within a network. This provides an effective way of determining whether or not a host is performing suspicious activity over an administrative protocol.

In particular, at 300, data for the network traffic is collected, and metadata processing is performed upon that data. This processing may include, for example, identification of certain items of metadata that are pertinent to the malicious admin analysis, such as port number, protocol identification, sender ID, receiver ID, etc. The processed metadata may be stored within a database.

At 302, the metadata derived from the network communications is examined to identify administrative hosts and administrative realms. This provides an approach for identifying a host that performs administrative activity, where one or more hosts can be identified as being an administrator. Additional hosts can be identified which are administered by the administrator hosts. The group of hosts identified as being administered by an administrator can considered as the administrator's realm. The analyzed communications and identification of hosts/realms can be stored within a database. Further details regarding an approach to perform admin/realm analysis is described below in conjunction with the description of FIG. 4.

Additionally, at 304, the system performs anomaly detection to identify suspicious administrative activity in an organization's network via observation and learning of administrative hosts, administrative network activity, and administrative behavior. Suspicious activity can then be defined as a host accessing an administrator's realm when it has not typically done so. Additionally, suspicious activity can also be flagged for a connection wherein the initiator host, who is not an administrator, administers a target host over a specific subset of administrative ports or protocols, with analysis results stored into a database and/or output as a set of one or more reports and/or alerts. Further details regarding an approach to perform anomaly analysis is described below in conjunction with the description of FIG. 5.

At 306, the system may update the learned behaviors to reflect updated admin relationships within the network. Further details regarding an approach to perform the updating analysis is described below in conjunction with the description of FIG. 11.

Figure 4:
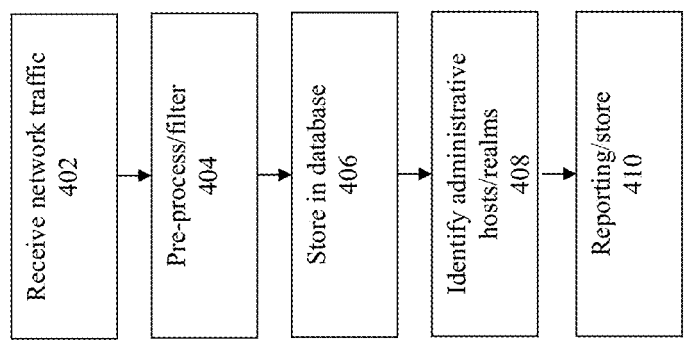
FIG. 4 shows a flowchart of a process for analyzing communications to identify admin hosts and admin realms.

FIG. 4 shows a flowchart of an approach for analyzing communications to learn the "normal" behavior of the network and identification of admin hosts and admin realms. At 402, network traffic is received for analysis. Network traffic enters the system from, for example, a network switch.

The collected traffic may be buffered and then processed by a preprocessor at 404. The preprocessor performs some or all the following tasks (although it is not limited to these listed below):

Performs protocol identification via packet data or port analysis

Distills the data down to summary statistics for each connection over specific time intervals Filters the data based on what is required for the algorithms At 406, the data that is generated by the preprocessor is then placed into a database, e.g., a graph-based database or an ordinary relational database. A graph database can be used to store connection relationships between hosts, wherein vertices can represent hosts or communication, and edges can represent either communications or hosts respectively. These vertices and edges can additionally store attributes of the host or communications. Together these vertices and edges form a connection graph. A graph can be stored in a non-graph database such as a relational database having a set of columns, where each column pertains to a specific attribute of the communications metadata, such as port ID, protocol ID, sender, receiver, time/date, etc. Each row corresponds to a different communications entry (e.g., session, packet, etc.) that is being tracked. The host relationships can then be derived from analysis of the values placed into each column.

At 408, the system performs identification of the hosts that are functioning as administrative hosts, along with identification of the other hosts that are being administered by the administrative hosts. In some embodiments, the identification of an administrative host is performed per administrative port or protocol. There are some administrative protocols which are "softer" than others in that those protocols can be used for purposes beyond just administration. Other protocols are used for administrative purposes only.

For a specific protocol, all communications over that protocol over a time window are queried. The determination of which host is an administrator and what is its realm is determined via a heuristic and/or graph theoretic measure. This determination can take into account connection stability (e.g. connects to similar hosts consistently over a period of time) as well as connection volume (e.g. number of hosts connected to). Other measures can include, but are not limited to, graph theoretic measures such as, graph outbound degree, centrality, or connectedness. The storage of the administrative hosts and realms can be kept within the database (410), either by annotating the existing connectivity graph or by creating a new graph.

Figure 6A:
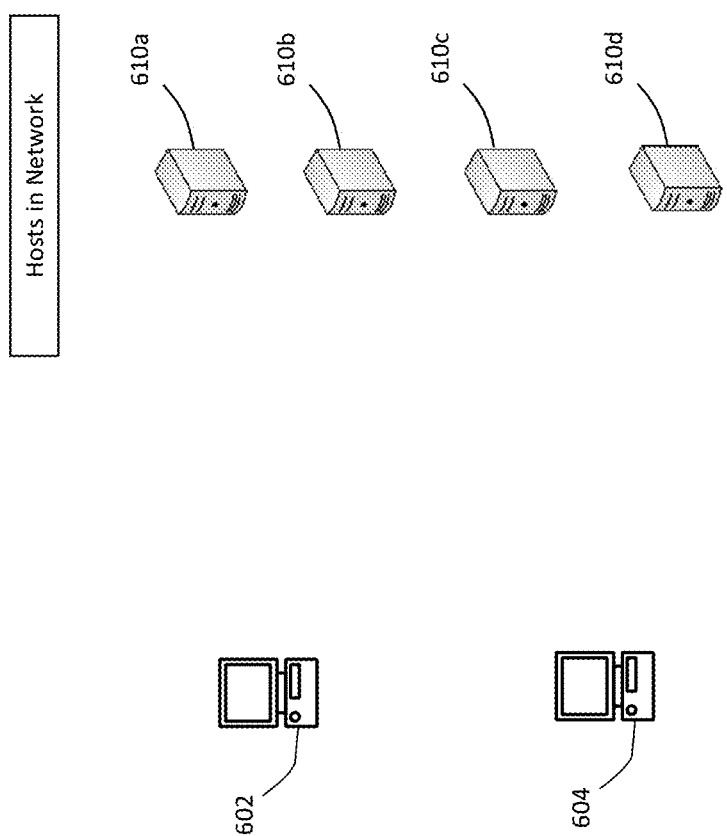
FIGS. 6A-6D illustrate a process for identification of admin hosts and admin realms.
Figure 6B:
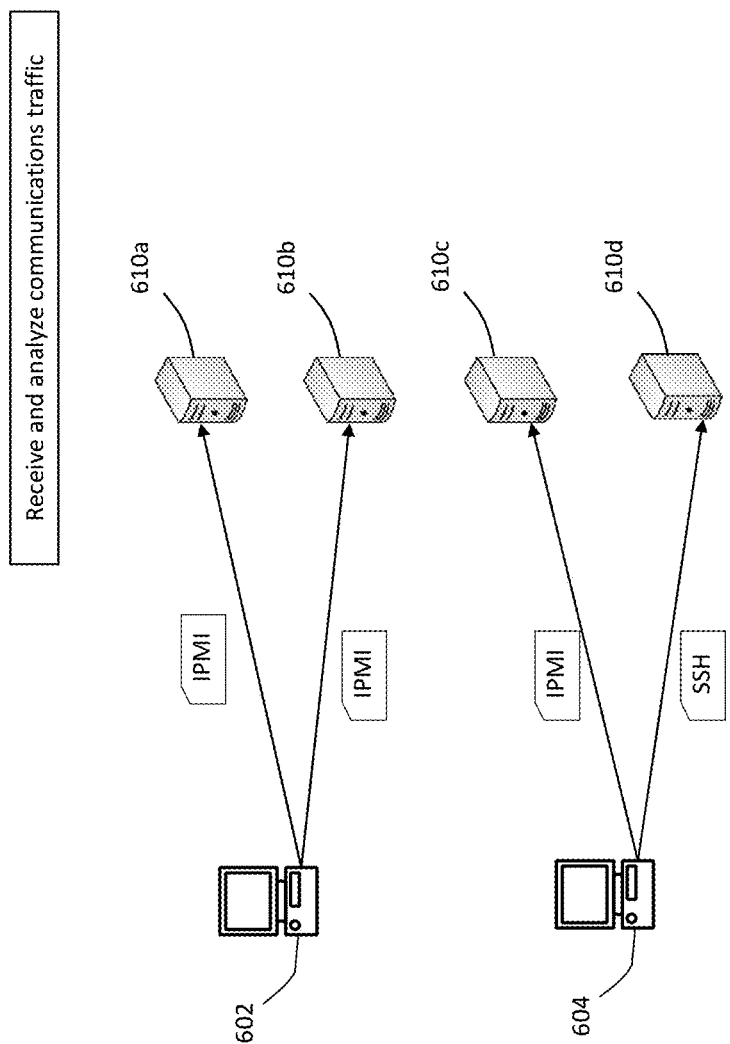

FIGS. 6A-6D illustrate this process for identification of admin hosts and admin realms. FIG. 6A shows a set of hosts within a network, including hosts 602, 604, and 610*a-d*. FIG. 6B illustrates the communications patterns that are identified from the communications traffic. Here, host 602 has communicated using the IPMI protocol to hosts 610*a* and 610*b*. In addition, host 604 has communicated using the IPMI protocol to host 610*c*, and has communicated using the SSH protocol to host 610*d*.

Figure 6C:
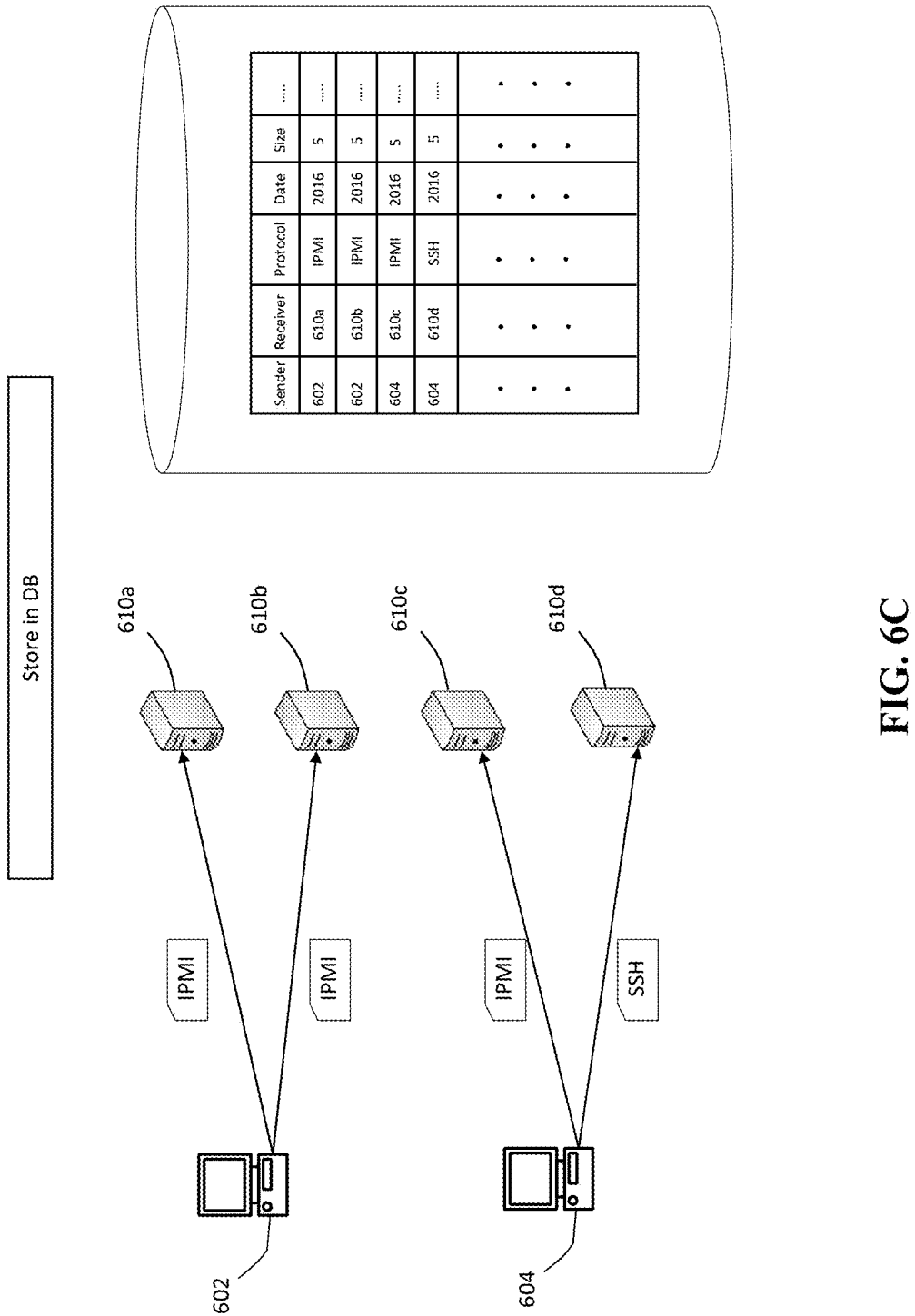

The metadata derived from these communications are stored into a database, as shown in FIG. 6C. Examples of information to collect and store in the database include, for example, port ID, protocol, bytes sent/received, duration of communications, source and destination (e.g., based upon IP address), and timestamp of the communications. For the sake of illustration, the database shown in this figure is a relational database, but it is noted that other types of databases may also be employed to hold the data. For example, a graph-based database may be used to store in a graph-based manner the relationships between the different entities in the network.

Figure 6D:
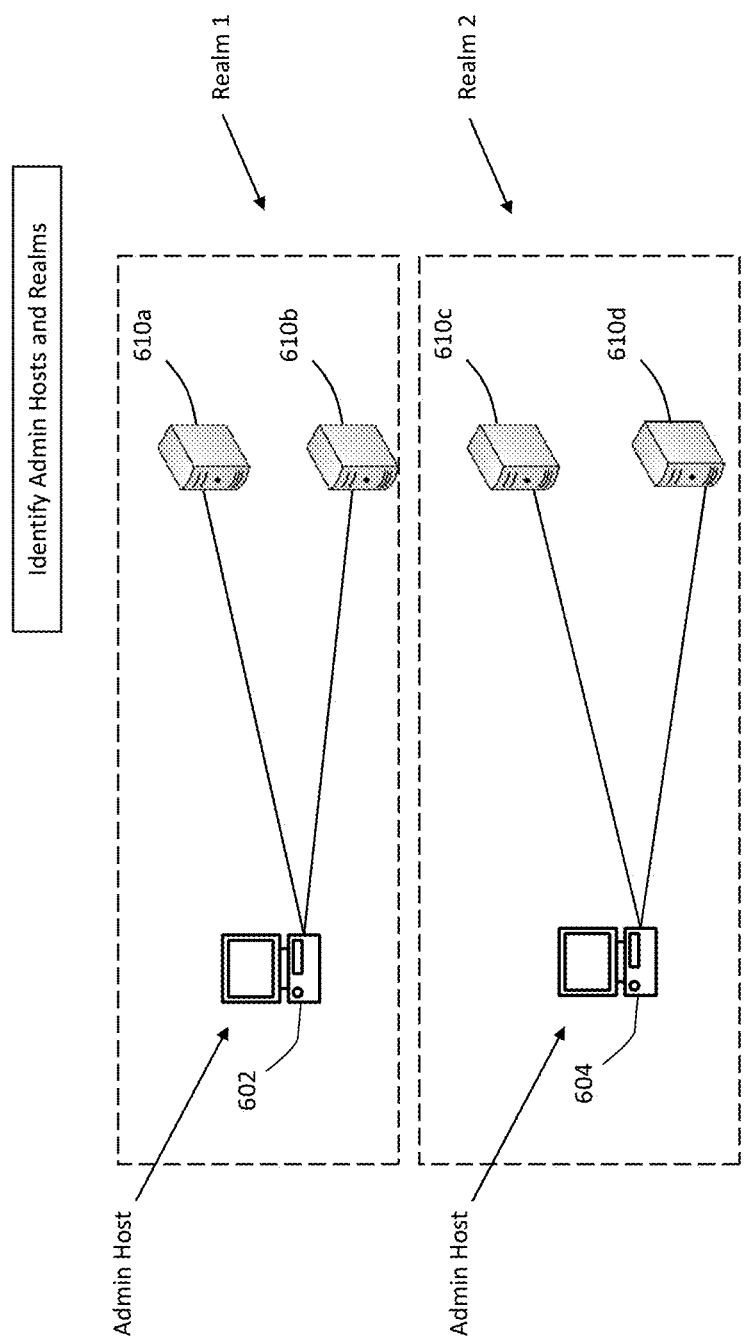

As shown in FIG. 6D, using the collected metadata, administrative hosts and administrative realms can be identified from the host within the network. By tracking the communications over a given period of time, a "normal" pattern can be determined to identify the hosts that routinely apply administrative protocols to certain other hosts.

As noted above, this analysis can be performed on a protocol-by-protocol basis over a given time period, where the determination of which host is an administrator and what is its realm can be determined via a heuristic and/or graph theoretic measure. This determination can take into account connection stability as well as connection volume. Other measures can include, but are not limited to graph theoretic measures such as, graph outbound degree, centrality, or connectedness.

Here, hosts 602 and 604 are identified as administrative hosts due to their routine use of communications to other hosts using admin-specific protocols. In addition, the hosts that are administered by the admin hosts 602 and 604 can be identified. Here, hosts 610*a* and 610*b* are administered by admin host 602. In addition, hosts 610*c* and 610*d* are administered by admin host 604.

At this point, administrative realms can be identified from the various relationships between the hosts. Given the identified admin relationships between hosts 602, 610*a*, and 610*b*, these hosts can be identified as corresponding to a first administrative realm. In addition, given the identified admin relationships between hosts 604, 610*c*, and 610*d*, these hosts can be identified as corresponding to a second administrative realm.

The information regarding the identified administrative hosts and realms can be maintained within the database, e.g., by creating or modifying connectivity graphs in the database.

Figure 5:
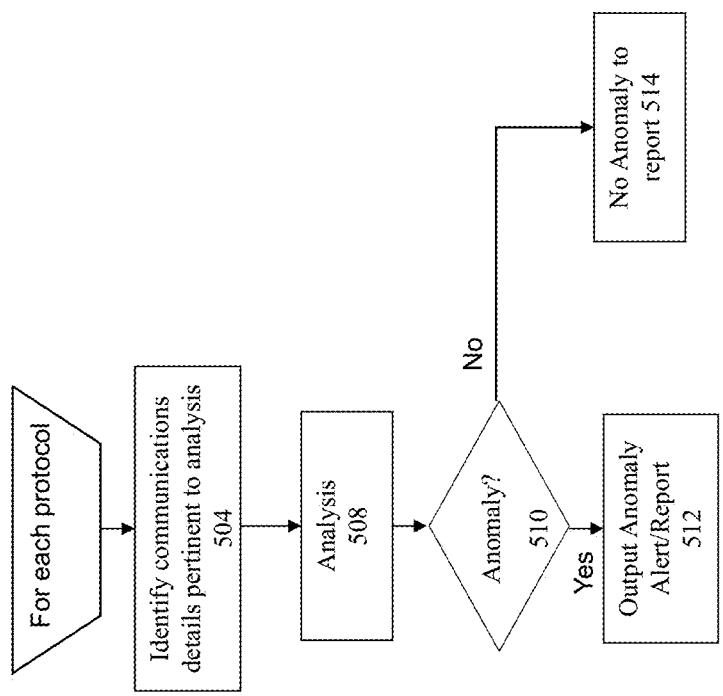
FIG. 5 shows a flowchart of an approach that can be taken to perform anomaly detection.

FIG. 5 shows a flowchart of an approach that can be taken to perform anomaly detection. The anomaly detection process may be performed independently, or in parallel, with the above-described process to identify hosts/realms. This processing determines whether something has accessed a resource in an unexpected manner.

It is noted that in some embodiments, the anomaly detection module will examine the most recent connections over a specific protocol. Protocol identification may occur by examining the port number of the communications. For example, any communications over port 22 is likely to be using the SSH protocol. If the communication is over a non-standard port number, then packet header/message examination may be performed to identify the protocol.

At 504, the communications details/metadata pertinent to the analysis are identified. For example, of interest to the analysis are the source and destinations of the connections, as well as information such as duration of the communications, timestamp, and number of bytes that have been sent and received.

At 508, analysis is performed over the collected data to determine if there is an admin anomaly. Heuristical analysis may be performed based upon at least the type of protocol in question, as well as the entities that are the involved in the communications relationship.

Certain protocols are likely to only be used for administrative purposes, such as IPMI. In certain cases, where the protocol in question is purely used for administrative purposes, if a connection has never been seen before, this may trigger a detection event. In certain embodiments, this approach may be modified to account for whether the origin of the communications is a known admin host, where even if the connection has not been seen before, the fact that a known admin host is using the admin protocol makes it less likely to be a malicious detection event.

Other protocols may be indicative of administrative purposes, but may also be used for other purposes as well, such as SSH, VNC, RDP. In these cases, additional analysis may be performed to determine whether a malicious detection event has been detected. The type and/or pattern of behaviors can be checked to see if they correspond to an anomaly.

In some cases, if a host is connecting to a member of an administrator's realm, then it may potentially also trigger a detection.

There can be additional criteria for which the connection may be considered normal, or for which the connection will be learned as normal. For example, learning whether a specific resource is a common resource used by many hosts may prevent a detection. Additionally, if an accessor to another administrator's realm is already an administrator, a comparison of the two administrator realms can be performed to determine whether or not a detection is warranted. There may be other heuristics or graph theoretic measures by which to determine whether or not a potential connection is anomalous.

There are certain protocols that are (by themselves) not normally considered as indicators of administrative activity, such as HTTP. In these cases, it is highly unlikely to be an indicator of an admin anomaly.

Once a connection is determined to be anomalous (510), then a detection event can be triggered at 512. A scoring module may be employed in some embodiments to receive the detection event and to generate a score indicating, for example, the threat potential and/or the certainty level of the threat. The detection event can be passed to the score module, e.g., via a database or interprocess communication.

Figure 7A:
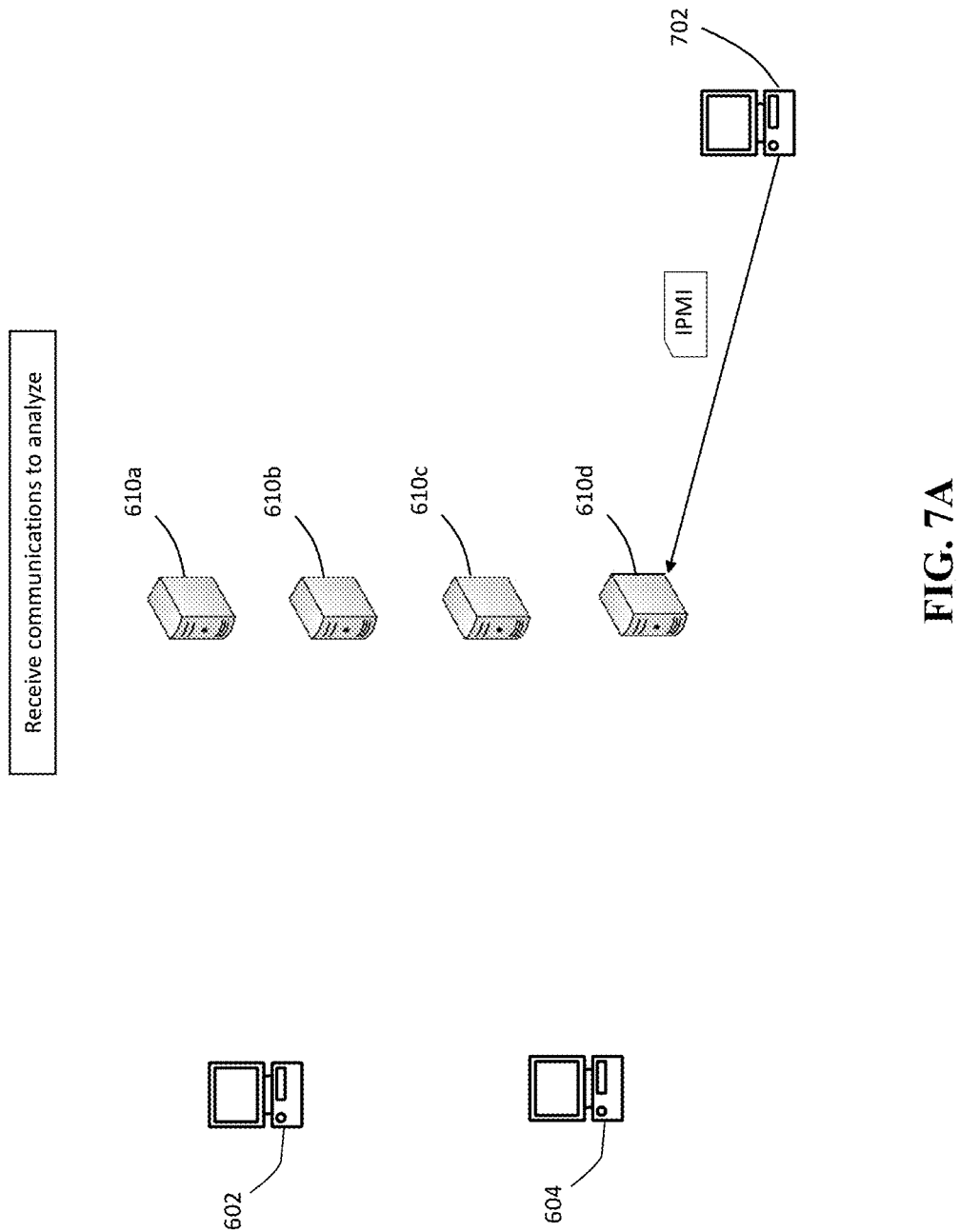
Figure 7B:
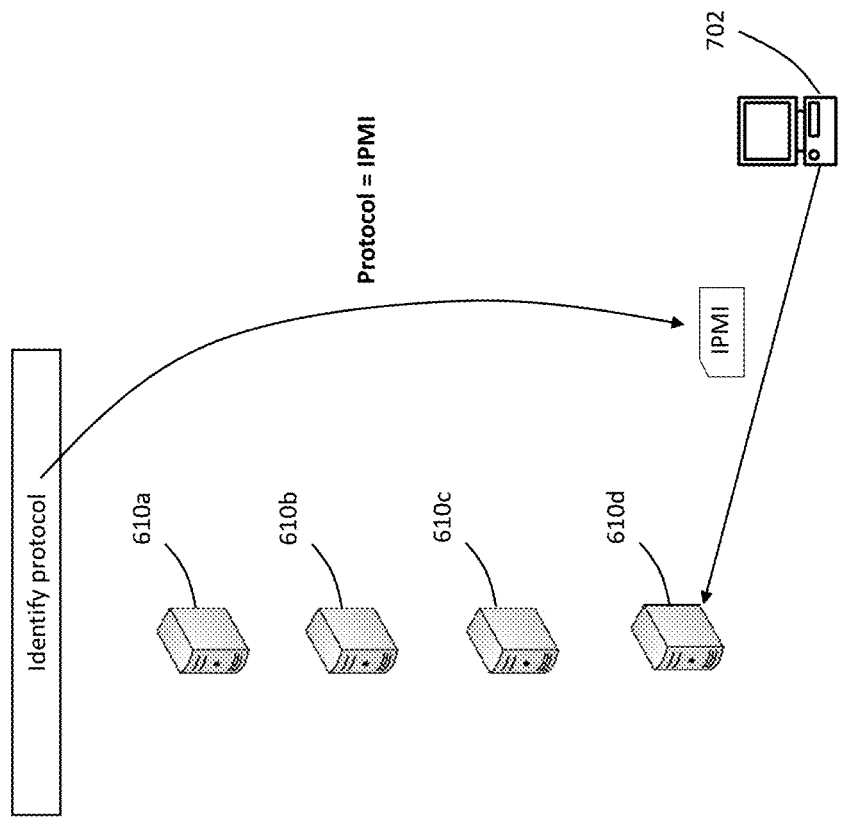
Figure 7B:

FIGS. 7A-7D provide an illustrative example of this detection process, using the same admin hosts and realms that were identified from FIGS. 6A-6D. FIG. 7A illustrates the start of the analysis for communications that have been received between host 702 and host 610*d*. As shown in FIG. 7B, the protocol is identified for this communications, where in this current communications, the identified protocol is IPMI.

Figure 7C:
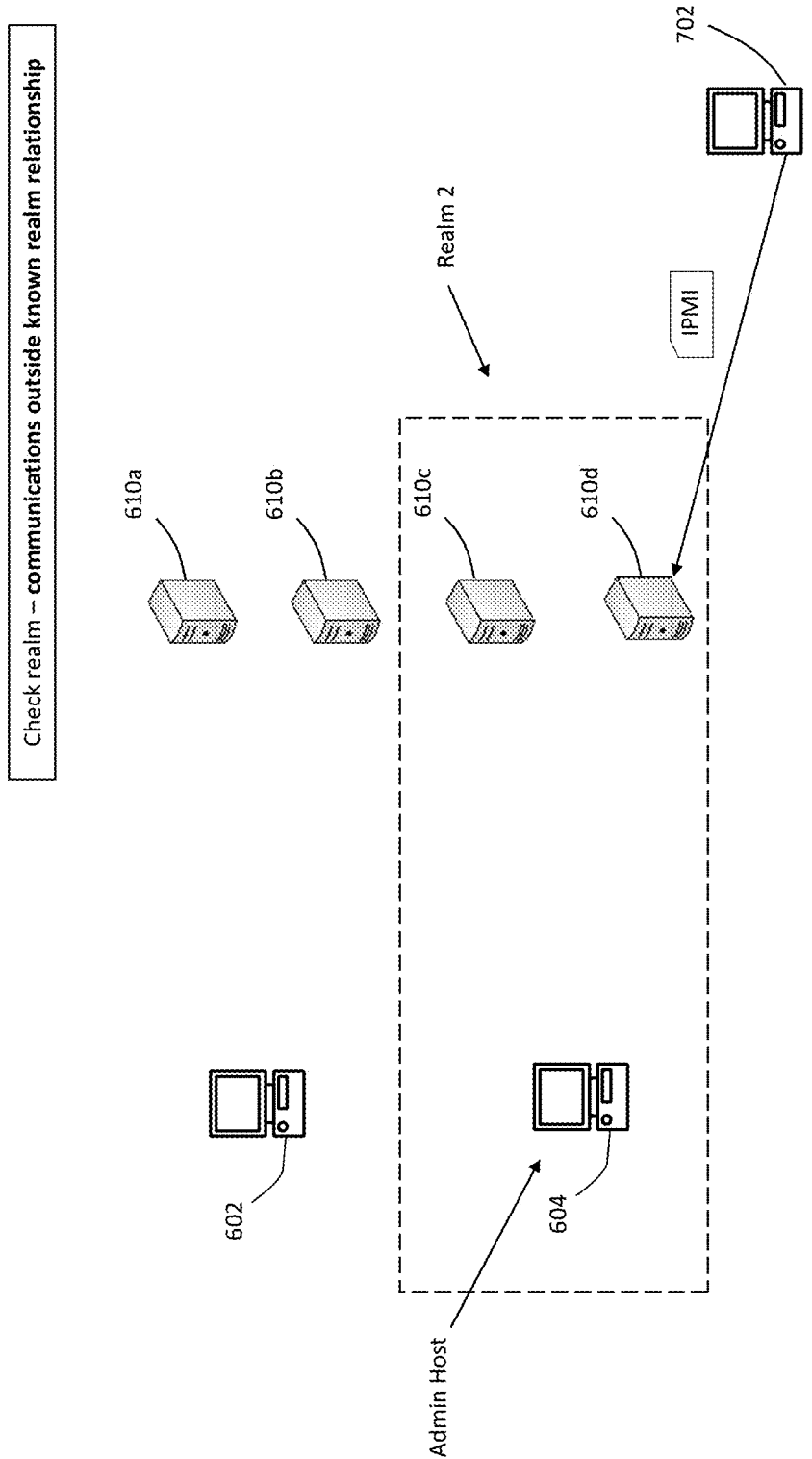

As shown in FIG. 7C, the previously identified admin/realm relationships are checked to see if the current communications fit within any known patterns. From the previous analysis, it is known that the normal admin realm for host 610*d* is within realm 2, where the admin host is host 604 and host 610*d* is typically administered by only host 604. Therefore, in the current situation, the connection involving host 702 is outside of known realm relationships, and is likely to be a connection that has never been seen before.

Figure 7D:
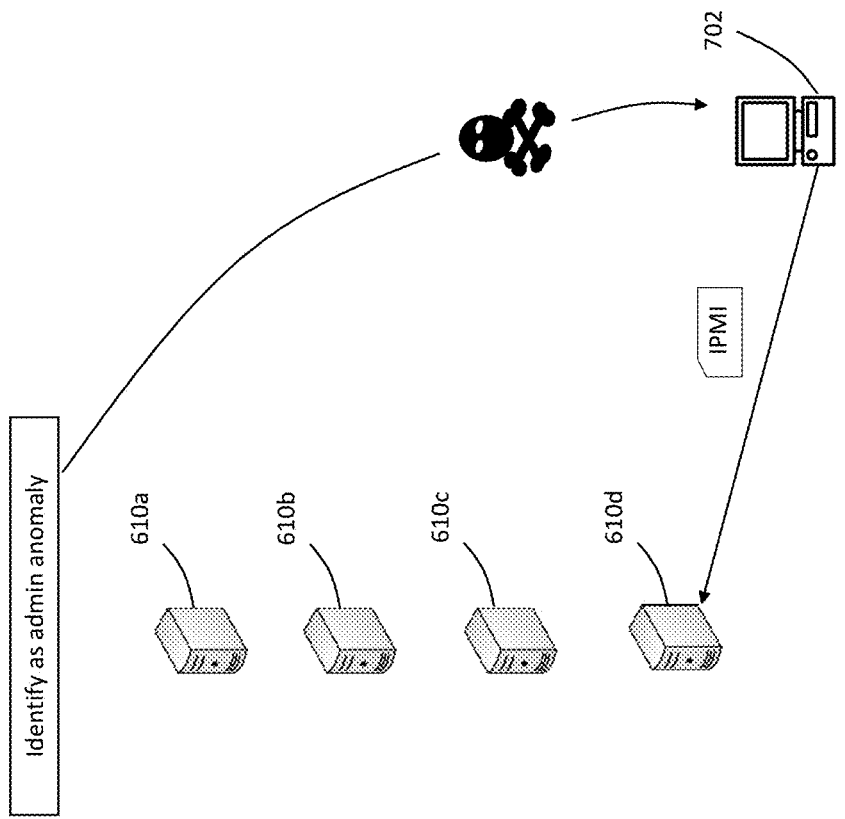

In this situation, since the protocol for the communications (IPMI) from host 702 is purely used for administrative purposes, and since the connection is outside of the normal admin realms, then as shown in FIG. 7D, a detection event is triggered to indicate the possibility of a malicious admin event involving host 702.

Figure 8A:
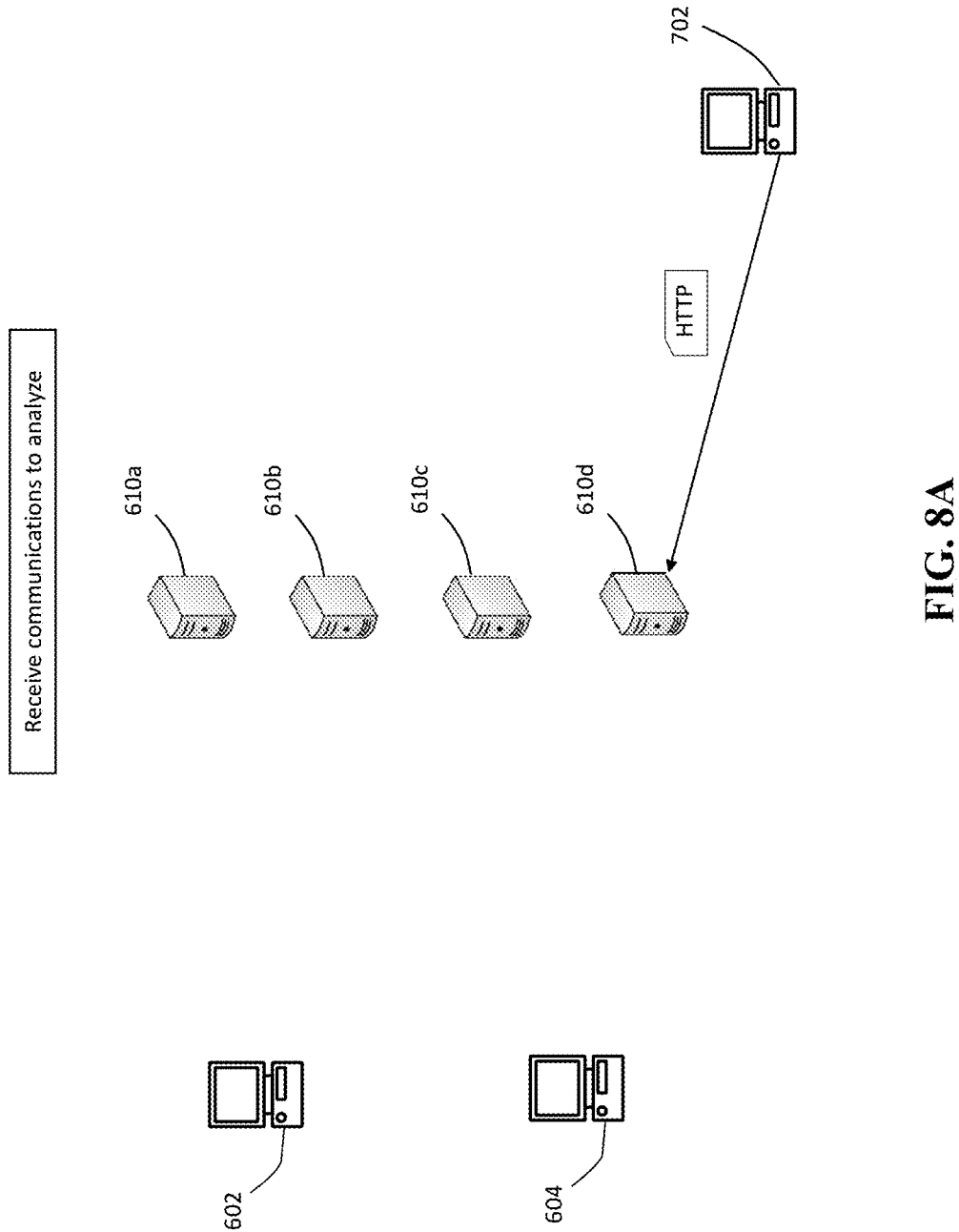
Figure 8B:
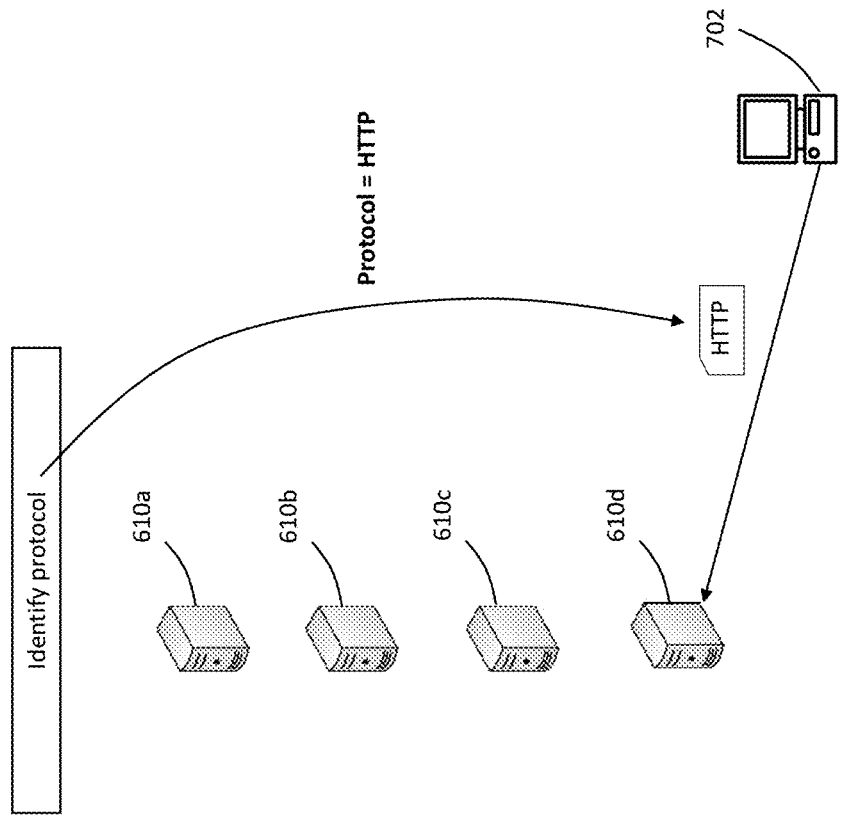
Figure 8B:
Figure 8C:
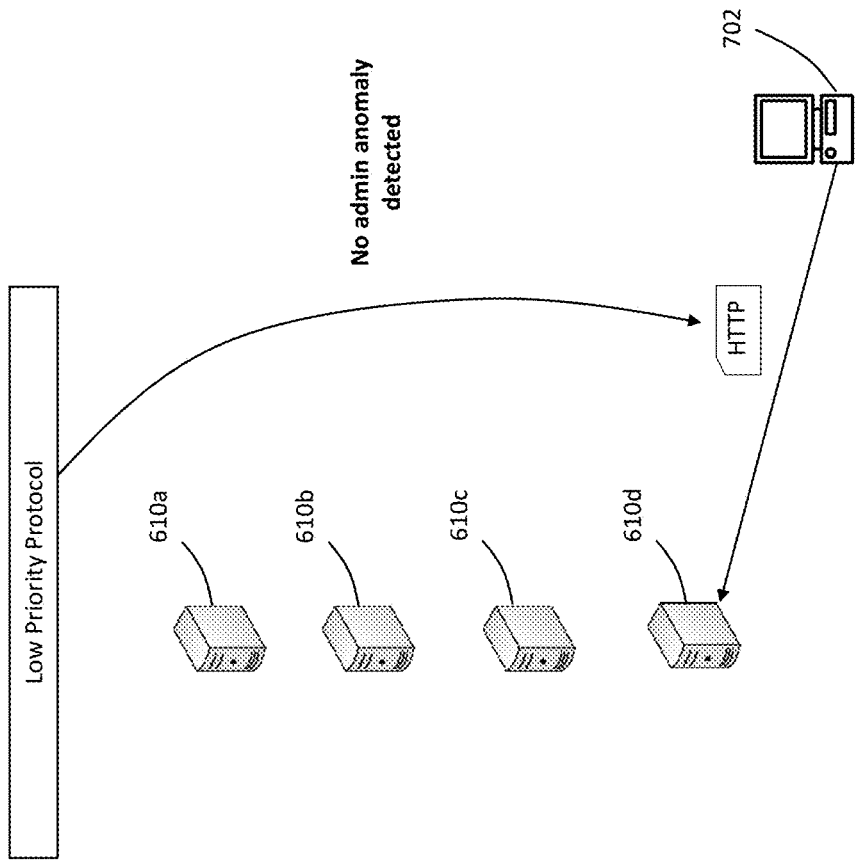
Figure 8C:

FIGS. 8A-8D provide another illustrative example of the detection process. FIG. 8A illustrates the start of the analysis for communications that have been received between host 702 and host 610*d*. As shown in FIG. 8B, the protocol is identified for this communications, where in this current communications, the identified protocol is IPMI. Since HTTP is not normally considered an admin-specific protocol, then as shown in FIG. 8C, this situation is not normally considered for triggering an anomaly event.

Figure 9A:
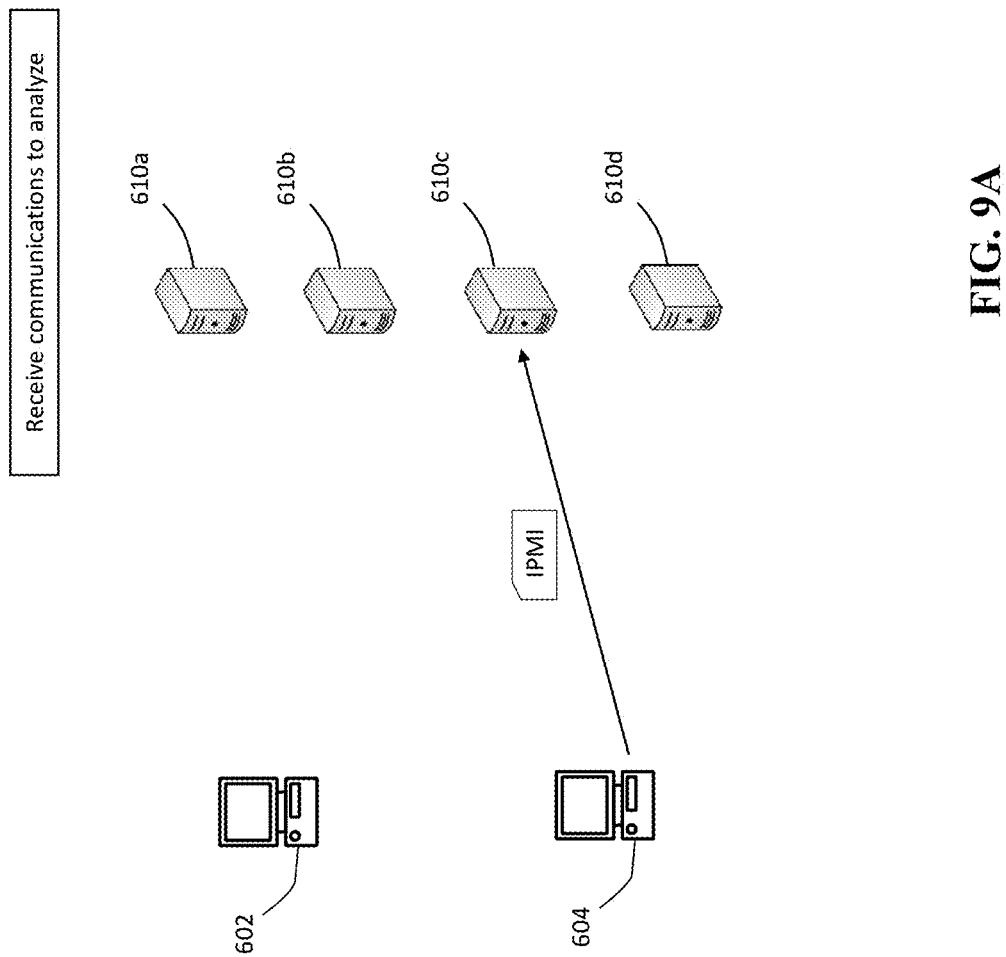
Figure 9B:
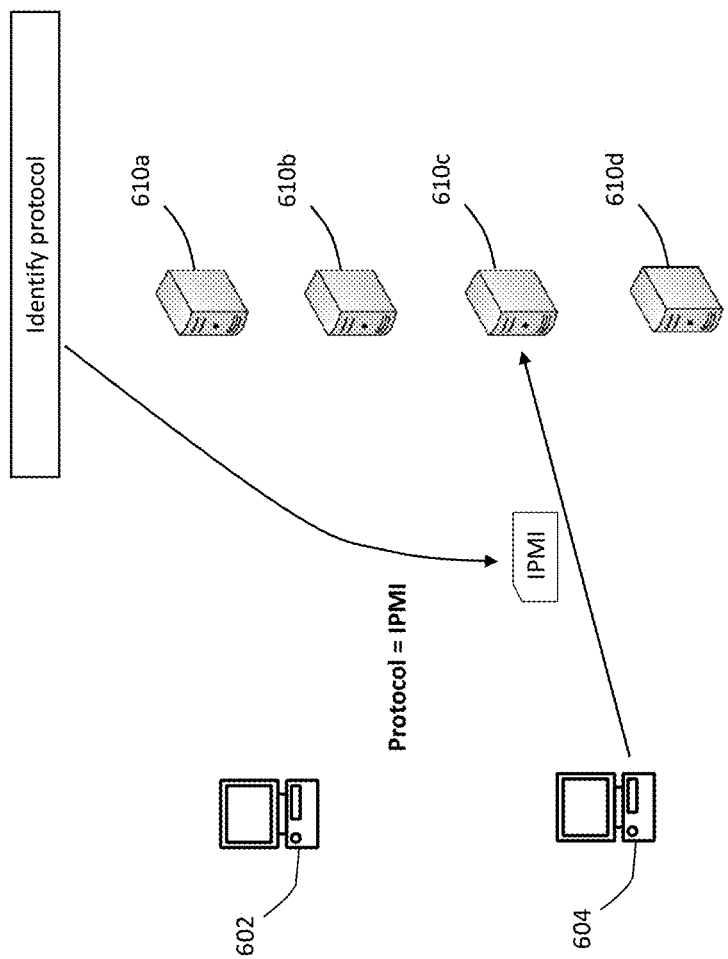

FIGS. 9A-9D provide yet another illustrative example of the detection process. FIG. 9A illustrates the start of the analysis for communications that have been received between host 604 and host 610*c*. As shown in FIG. 9B, the protocol is identified for this communications, where in this current communications, the identified protocol is IPMI.

Figure 9C:
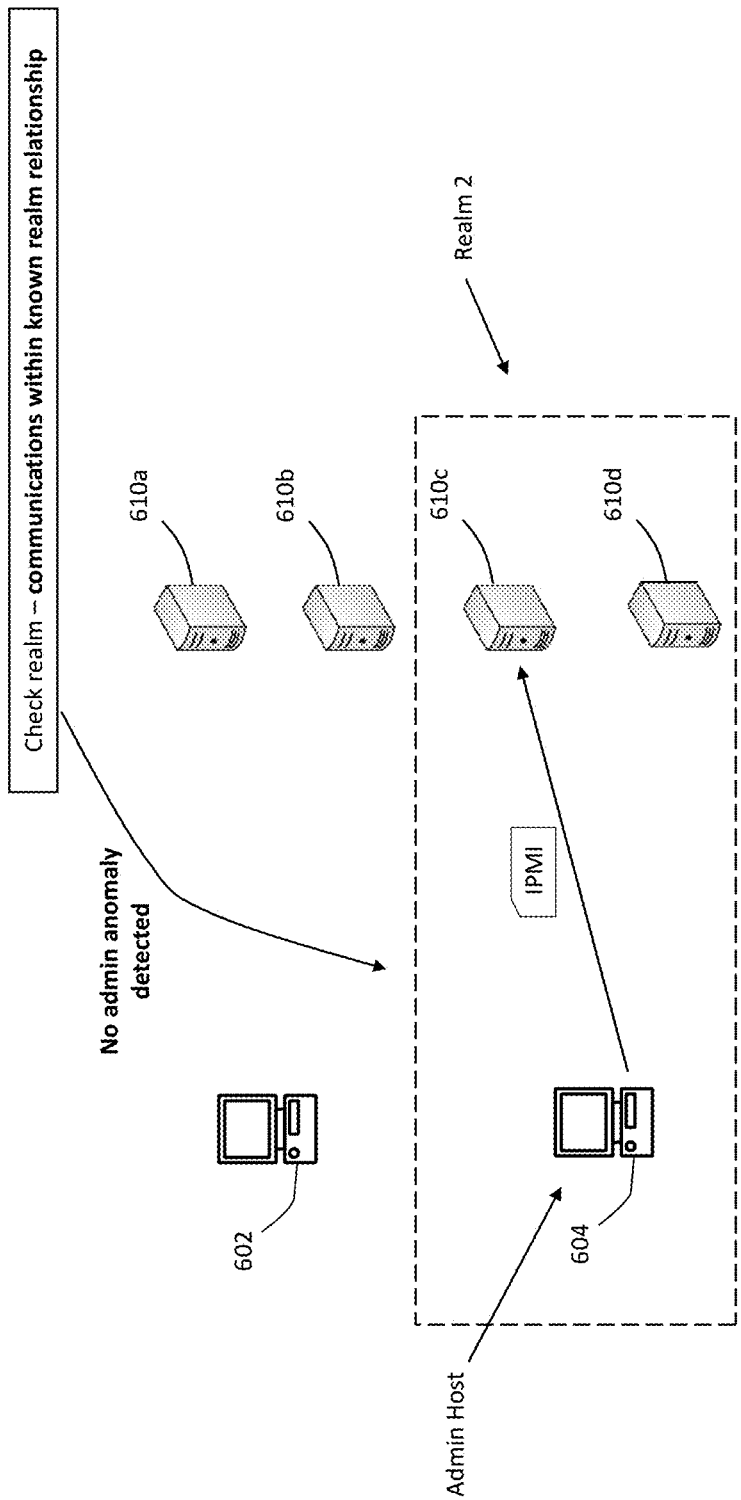

As shown in FIG. 9C, the previously identified admin/realm relationships are checked to see if the current communications fit within any known patterns. From the previous analysis, it is known that the normal admin realm for host 610*d* is within realm 2, where the admin host is host 604 and host 610*d* is typically administered by only host 604. Therefore, in the current situation, the connection involving host 604 to host 610*c* using the IPMI protocol is squarely within the known realm relationships. As such, this situation would not be considered for triggering an anomaly event.

Figure 10A:
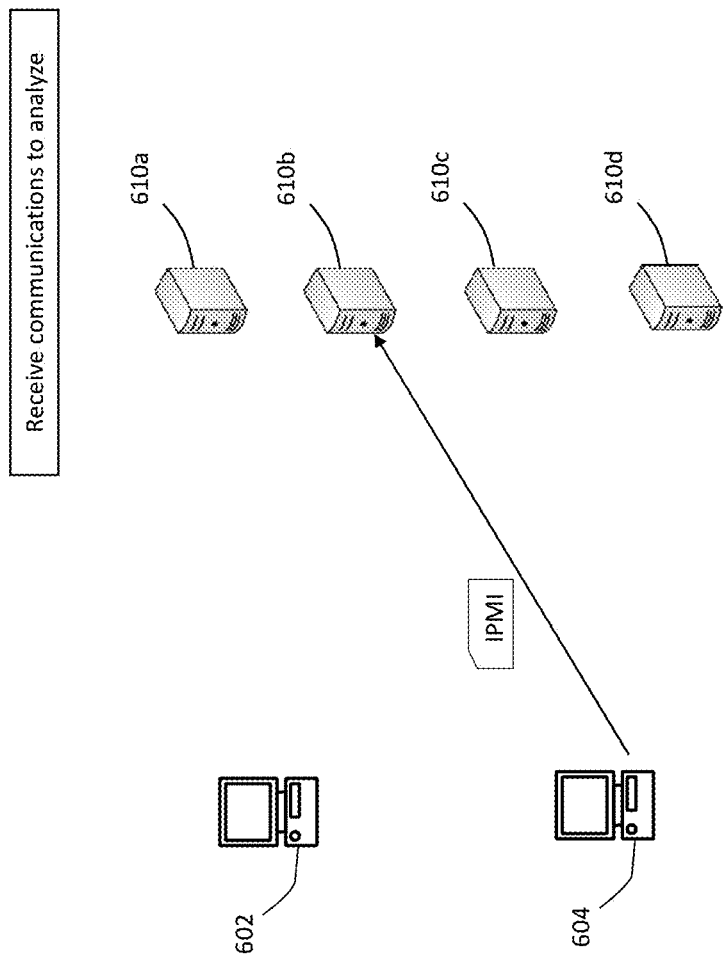
Figure 10B:
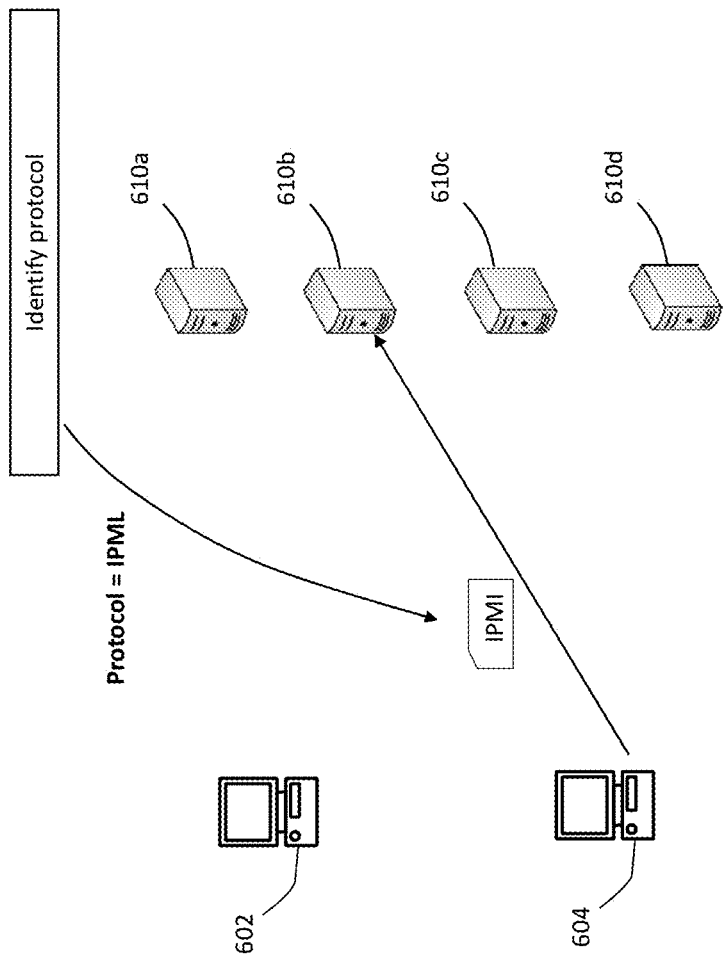

FIGS. 10A through 10D-2 provide another illustrative example of the detection process. FIG. 10A illustrates the start of the analysis for communications that have been received between host 604 and host 610*b*. As shown in FIG. 10B, the protocol is identified for this communications, where in this current communications, the identified protocol is IPMI.

Figure 10C:
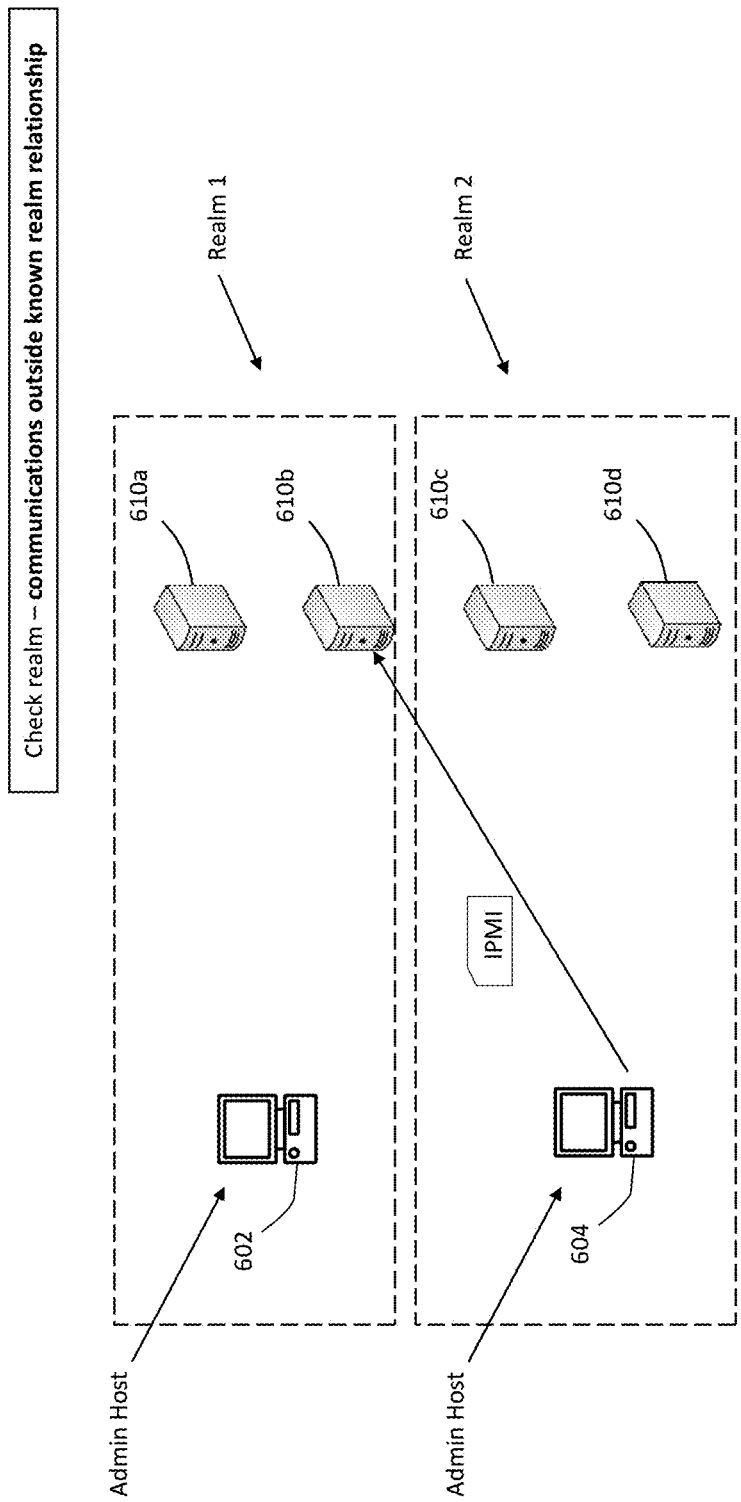

As shown in FIG. 10C, the previously identified admin/realm relationships are checked to see if the current communications fit within any known patterns. From the previous analysis, it is known that the normal admin realm for host 610*b* is within realm 1, where the admin host is host 602 and host 610*b* is typically administered by only host 602. Therefore, in the current situation, the connection involving host 604 to host 610*b* using the IPMI protocol is outside of the known realm relationships.

Figures 1, 10D:
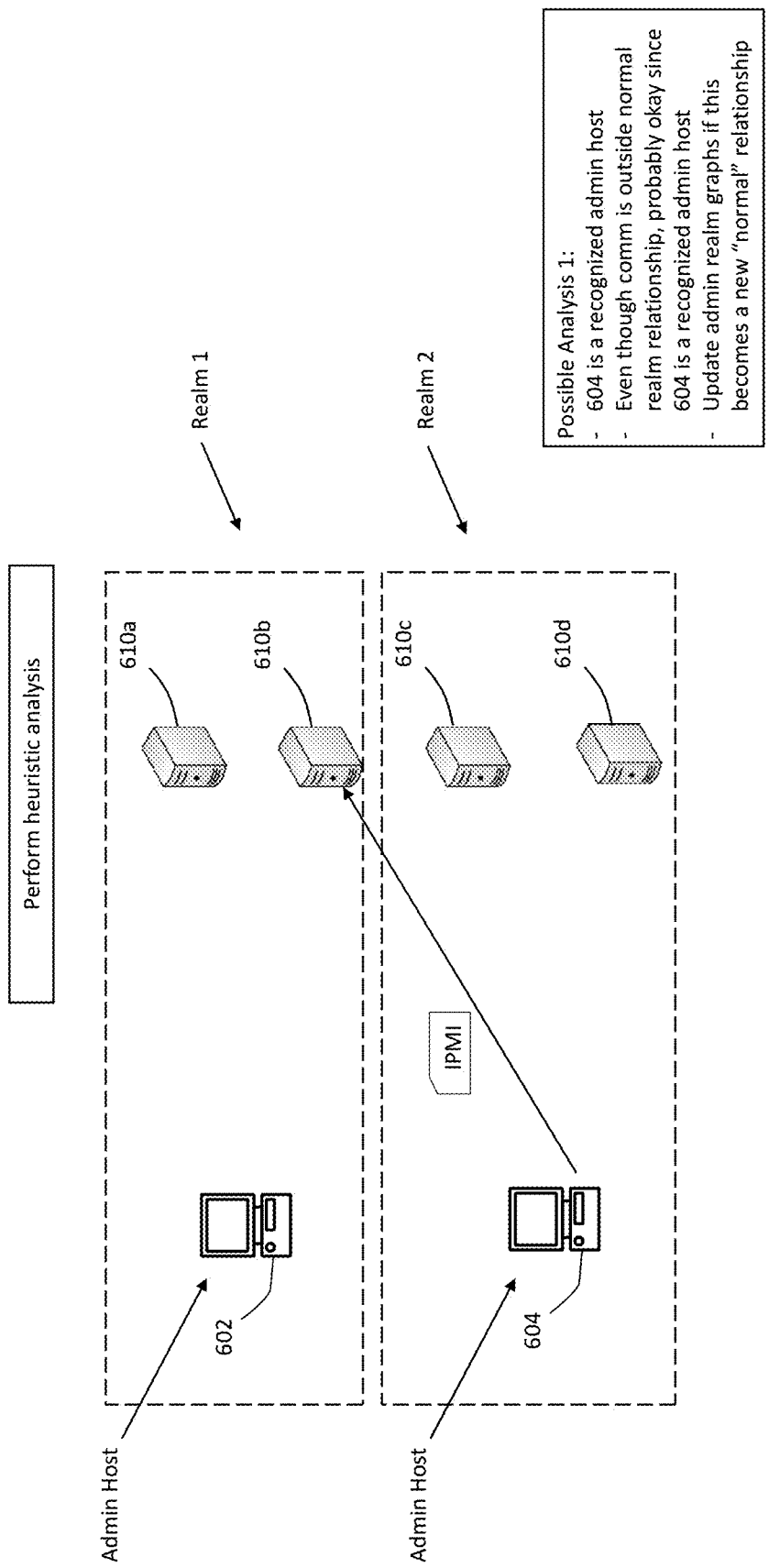
Figures 2, 10D:
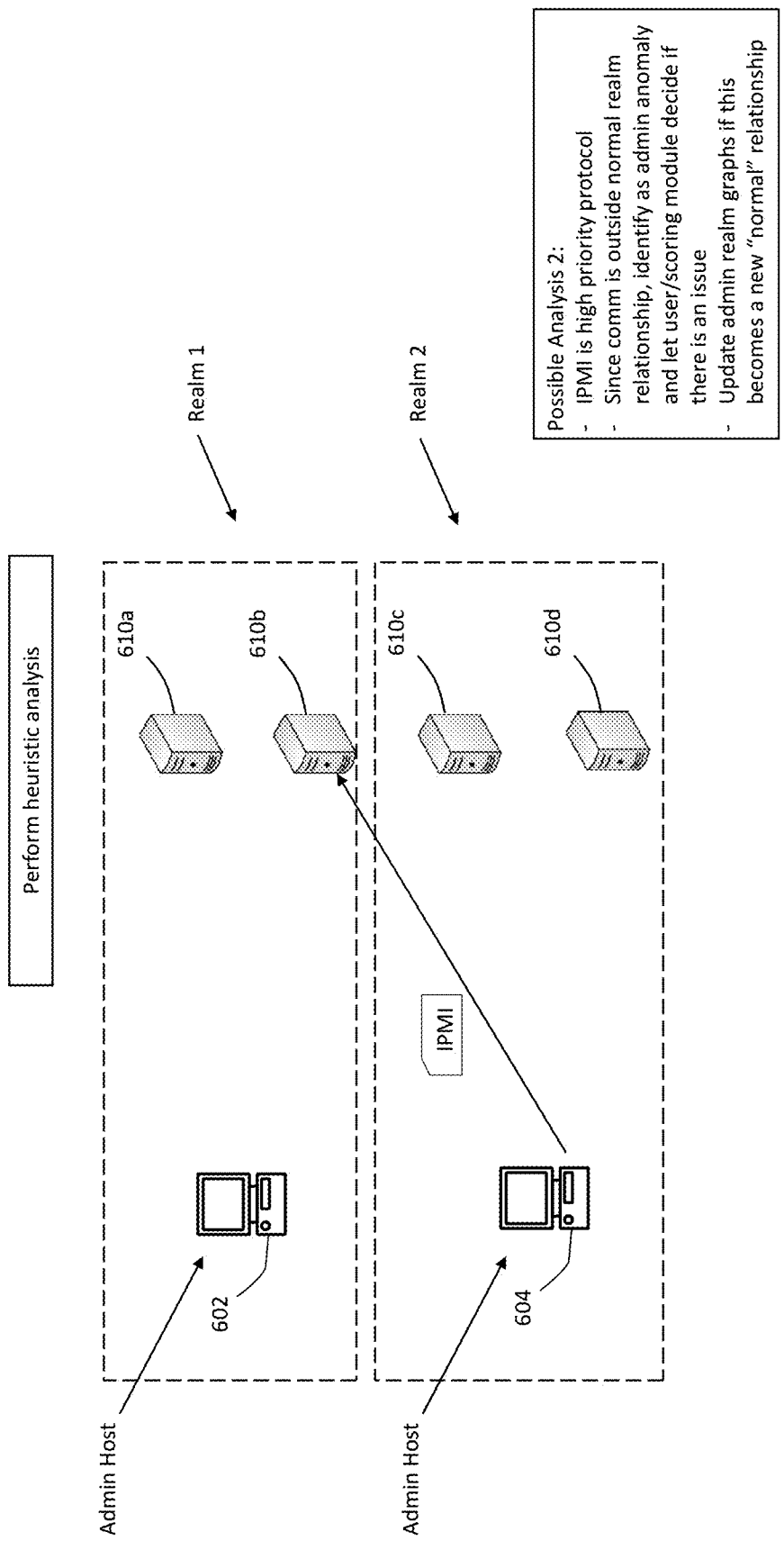

In this situation, there are numerous possible approaches that can be taken to handle the anomaly processing. As shown in FIG. 10D-1 in a first example approach, the fact that 604 is a recognized admin host is taken into consideration. Even though the connection is outside of a known admin realm relationship, since host 604 is an accepted admin host, this means that the connection is probably benign. Therefore, this situation may tend against being an anomaly that rises to the level of requiring a detection event.

As shown in FIG. 10D-2 in an alternative approach, the fact that the IPMI admin-specific protocol is being used weighs heavily in favor of triggering an anomaly event. Even though host 604 is a recognized admin host, the high priority of the protocol tips the consideration in favor of triggering the event. In this situation, the triggered event can be further analyzed by, for example, a scoring module or the user to make the final determination of whether a threat exists.

Figure 11:
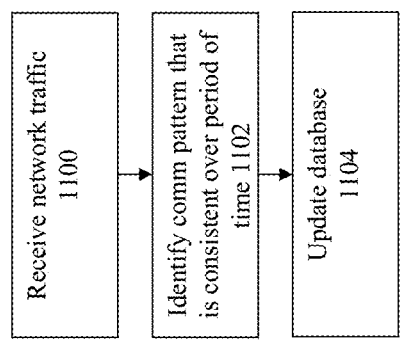
FIG. 11 shows a flowchart of an approach to implement a database update.

If the relationship between host 604 and host 610*b* becomes a new "normal", then the admin realm information in the database can be updated to reflect the new admin relationship. FIG. 11 shows a flowchart of an approach to implement this type of database update. At 1100, the network traffic is received and analyzed.

At 1102, identification is made of a communications pattern that is consistent over a designated period of time. For a given period of time, the process looks at the regularity, breadth, and/or frequency of the communications. This is to determine whether the communications ceases to be an anomaly and instead becomes a new normal pattern.

At 1104, the realm composition within the database is updated to reflect the new relationships. For graph-based databases, the storage of the new administrative relationships can be implemented by either annotating the existing connectivity graph(s) or creating new graph(s).

Therefore, what has been described is an improved approach for identifying suspicious administrative host activity within a network.

System Architecture Overview

Figure 12:
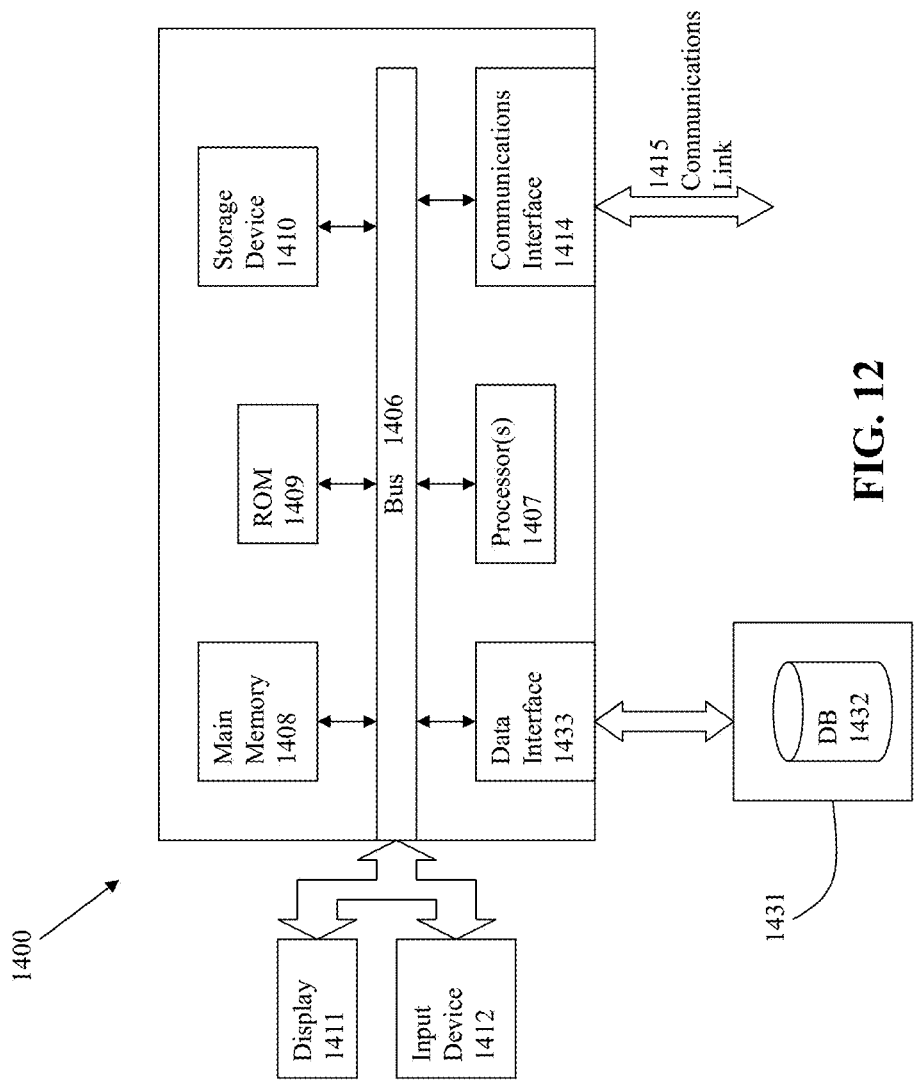
FIG. 12 is a block diagram of an illustrative computing system suitable for implementing an embodiment of the present invention.

FIG. 12 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, e.g., application code, through communication link 1415 and communication interface 1414. Received program code may be executed by processor 1407 as it is received, and/or stored in disk drive 1410, or other non-volatile storage for later execution. Computer system 1400 may communicate through a data interface 1433 to a database 1432 on an external storage device 1431.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for detecting network threats, comprising:
   collecting network traffic corresponding to communications within a network over a first time period;
   analyzing metadata for the network traffic to identify an administrative realm comprising an administrator host that performs administrative activity and an administered host that is administered by the administrator host;
   collecting additional network traffic corresponding to additional communications within the network over a second time period after the first time period and corresponding to two or more protocols;
   determining whether respective communications of the additional communications correspond to anomalous activity on a protocol by protocol and a communication by communication basis, at least by processing each communication individually, processing at least comprising:
      selecting a first communication corresponding to the additional network traffic and a first protocol;
      determining whether the first communication is to be identified as anomalous using the administrative realm and a first heuristic based on a first type of the first protocol;
      generating a first alert to identify suspicious activity pertaining to the first communication using the first protocol when the respective communication is determined to be identified as anomalous using the administrative realm and the first heuristic;
      selecting a second communication corresponding to the additional network traffic and a second protocol;
      determining whether the second communication is to be identified as anomalous using the administrative realm and a second heuristic based on a second type of the second protocol; and
      generating a second alert to identify suspicious activity pertaining to the second communication using the second protocol when the respective communication is determined to be identified as anomalous using the administrative realm and the second heuristic.

2. The method of claim 1, wherein the metadata for the network traffic is analyzed by:
   receiving the network traffic for analysis;
   pre-processing the network traffic by performing a task, including at least one of protocol identification, generating summary statistics over a time interval, or filtering network traffic data;
   storing pre-processed data into a database; and
   accessing the pre-processed data in the database to identify the administrator host that performs the administrative activity and to identify the administered host that are administered by the administrator host.

3. The method of claim 2, wherein the database comprises a graphical database that stores connection relationships between hosts in the network, wherein a vertex represents the host and edges represents communications between hosts.

4. The method of claim 1, wherein identification of the administrator host is performed per administrative protocol over a time period, and determination of the administrator host is performed via a heuristic or graph theoretic measure with consideration of at least one of account connection stability, connection volume, graph outbound degree, graph centrality, or graph connectedness.

5. The method of claim 1, wherein processing each communication individually further comprises:
   identifying a source and destination for the communication; and
   the first alert or the second alert corresponds to at least one of the protocol, the source, or the destination being different from established patterns previously identified for the administrative realm.

6. The method of claim 5, wherein at least one heuristic corresponds to an administrative protocol originating from a host that is not within the administrative realm and directed to administered host within the administrative realm.

7. The method of claim 5, wherein at least one heuristic corresponds to (a) a non-administrative protocol originating from or directed to a host that is within the administrative realm; (b) an administrative protocol originating from a known administrator host even if the known administrator host is not within the administrative realm; or (c) an administrative protocol originating from the administrator host to the administered host within the administrative realm.

8. The method of claim 1, further comprising updating administrative relationships by:
   receiving the network traffic for analysis;
   identifying a communications pattern that is consistent over a time period; and
   updating the administrative relationships for the administrative realm based at least in part upon the communications pattern.

9. A system for detecting network threats, comprising:
   a memory for holding a sequence of instructions; and
   a processor that executes the sequence of instructions to perform a set of acts comprising:

collecting network traffic corresponding to communications within a network over a first time period;

analyzing metadata for the network traffic to identify an administrative realm comprising an administrator host that performs administrative activity and an administered host that is administered by the administrator host;

collecting additional network traffic corresponding to additional communications within the network over a second time period after the first time period and corresponding to two or more protocols;

determining whether respective communications of the additional communications correspond to anomalous activity on a protocol by protocol and a communication by communication basis, at least by processing each communication individually, processing at least comprising:

selecting a first communication corresponding to the additional network traffic and a first protocol;

determining whether the first communication is to be identified as anomalous using the administrative realm and a first heuristic based on a first type of the first protocol;

generating a first alert to identify suspicious activity pertaining to the first communication using the first protocol when the respective communication is determined to be identified as anomalous using the administrative realm and the first heuristic;

selecting a second communication corresponding to the additional network traffic and a second protocol;

determining whether the second communication is to be identified as anomalous using the administrative realm and a second heuristic based on a second type of the second protocol; and generating a second alert to identify suspicious activity pertaining to the second communication using the second protocol when the respective communication is determined to be identified as anomalous using the administrative realm and the second heuristic.

10. The system of claim 9, wherein the set of acts further comprise:

receiving the network traffic for analysis;

pre-processing the network traffic by performing a task, including at least one of protocol identification, generating summary statistics over a time interval, or filtering network traffic data;

storing pre-processed data into a database; and accessing the pre-processed data in the database to identify the administrator host that performs the administrative activity and to identify the administered host that are administered by the administrator host.

11. The system of claim 10, wherein the database comprises a graphical database that stores connection relationships between hosts in the network, wherein a vertex represents the host and edges represents communications between hosts.

12. The system of claim 9, wherein identification of the administrator host is performed per administrative protocol over a time period, and determination of the administrator host is performed via a heuristic or graph theoretic measure with consideration of at least one of account connection stability, connection volume, graph outbound degree, graph centrality, or graph connectedness.

13. The system of claim 9, wherein processing each communication individually further comprises:

identifying a source and destination for the communication; and the first alert or the second alert corresponds to at least one of the protocol, the source, or the destination being different from established patterns previously identified for the administrative realm.

14. The system of claim 13, wherein at least one heuristic corresponds to an administrative protocol originating from a host that is not within the administrative realm and directed to the administered host within the administrative realm.

15. The system of claim 13, wherein at least one heuristic corresponds to (a) a non-administrative protocol originating from or directed to a host that is within the administrative realm; (b) an administrative protocol originating from a known administrator host even if the known administrator host is not within the administrative realm; or (c) an administrative protocol originating from the administrator host to the administered host within the administrative realm.

16. The system of claim 9, the set of acts further comprising updating administrative relationships by:

receiving the network traffic for analysis;

identifying a communications pattern that is consistent over a time period; and updating the administrative relationships for the administrative realm based at least in part upon the communications pattern.

17. A computer program product embodied on a non-transitory computer readable medium, the computer readable medium having stored thereon a sequence of instructions which, when executed by a processor, performs a set of acts for detecting network threats, the set of acts comprising:

collecting network traffic corresponding to communications within a network over a first time period;

analyzing metadata for the network traffic to identify an administrative realm comprising an administrator host that performs administrative activity and an administered host that is administered by the administrator host;

collecting additional network traffic corresponding to additional communications within the network over a second time period after the first time period and corresponding to two or more protocols;

determining whether respective communications of the additional communications correspond to anomalous activity on a protocol by protocol and a communication by communication basis, at least by processing each communication individually, processing at least comprising:

selecting a first communication corresponding to the additional network traffic and a first protocol;

determining whether the first communication is to be identified as anomalous using the administrative realm and a first heuristic based on a first type of the first protocol;

generating a first alert to identify suspicious activity pertaining to the first communication using the first protocol when the respective communication is determined to be identified as anomalous using the administrative realm and the first heuristic;

selecting a second communication corresponding to the additional network traffic and a second protocol;

determining whether the second communication is to be identified as anomalous using the administrative realm and a second heuristic based on a second type of the second protocol; and generating a second alert to identify suspicious activity pertaining to the second communication using the second protocol when the respective communication is determined to be identified as anomalous using the administrative realm and the second heuristic.

18. The computer program product of claim 17, wherein the metadata for the network traffic is analyzed by:
receiving the network traffic for analysis;
pre-processing the network traffic by performing a task, including at least one of protocol identification, generating summary statistics over a time interval, or filtering network traffic data;
storing pre-processed data into a database; and
accessing the pre-processed data in the database to identify the administrator host that performs the administrative activity and to identify the administered host that are administered by the administrator host.

19. The computer program product of claim 18, wherein the database comprises a graphical database that stores connection relationships between hosts in the network, wherein a vertex represents the host and edges represents communications between hosts.

20. The computer program product of claim 17, wherein identification of the administrator host is performed per administrative protocol over a time period, and determination of the administrator host is performed via a heuristic or graph theoretic measure with consideration of at least one of account connection stability, connection volume, graph outbound degree, graph centrality, or graph connectedness.

21. The computer program product of claim 17, wherein processing each communication individually further comprises:
identifying a source and destination for the communication; and
the first alert or the second alert corresponds to at least one of the protocol, the source, or the destination being different from established patterns previously identified for the administrative realm.

22. The computer program product of claim 21, wherein at least one heuristic corresponds to an administrative protocol originating from a host that is not within the administrative realm and directed to the administered host within the administrative realm.

23. The computer program product of claim 21, wherein at least one heuristic corresponds to (a) a non-administrative protocol originating from or directed to a host that is within the administrative realm; (b) an administrative protocol originating from a known administrator host even if the known administrator host is not within the administrative realm; or (c) an administrative protocol originating from the administrator host to the administered host within the administrative realm.

24. The computer program product of claim 17, wherein the sequence of instructions which, when executed by a processor, updates administrative relationships by:
receiving the network traffic for analysis;
identifying a communications pattern that is consistent over a time period; and
updating the administrative relationships for the administrative realm based at least in part upon the communications pattern.

* * * * *